US010187755B2

(12) United States Patent
Kusens et al.

(10) Patent No.: US 10,187,755 B2
(45) Date of Patent: Jan. 22, 2019

(54) ELECTRONIC ASSET LOCATION IDENTIFICATION AND TRACKING SYSTEM WITH RECEIVER CLUSTERING

(71) Applicant: COLLATERAL OPPORTUNITIES, LLC, Wilmington, DE (US)

(72) Inventors: Bruce Howard Kusens, North Miami Beach, FL (US); Michael Kusens, Cooper City, FL (US)

(73) Assignee: COLLATERAL OPPORTUNITIES, LLD, Wilmington, DE (US)

( * ) Notice: Subject to any disclaimer, the term of this patent is extended or adjusted under 35 U.S.C. 154(b) by 0 days.

(21) Appl. No.: 15/279,370

(22) Filed: Sep. 28, 2016

(65) Prior Publication Data
US 2017/0094477 A1 Mar. 30, 2017

Related U.S. Application Data

(60) Provisional application No. 62/234,512, filed on Sep. 29, 2015.

(51) Int. Cl.
H04W 4/02 (2018.01)
H04L 29/12 (2006.01)
H04W 4/04 (2009.01)

(52) U.S. Cl.
CPC ........... *H04W 4/043* (2013.01); *H04W 4/025* (2013.01); *H04L 61/6022* (2013.01)

(58) Field of Classification Search
CPC ....... H04W 64/00; H04W 4/02; H04W 24/00; G06K 2017/0045
See application file for complete search history.

(56) References Cited

U.S. PATENT DOCUMENTS

| 5,583,933 | A | * | 12/1996 | Mark | ................... G06Q 20/341 235/380 |
|---|---|---|---|---|---|
| 5,642,303 | A | | 6/1997 | Small | |
| 6,812,824 | B1 | | 11/2004 | Goldinger | |
| 7,367,497 | B1 | | 5/2008 | Hill | |
| 7,600,679 | B2 | | 10/2009 | Kshirsagar | |
| 8,009,013 | B1 | | 8/2011 | Hirschfeld | |
| 8,446,249 | B2 | | 5/2013 | Gerstenkorn | |

(Continued)

FOREIGN PATENT DOCUMENTS

| KR | 20120031787 A | 4/2012 |
|---|---|---|
| WO | 2010/046727 A2 | 4/2010 |

OTHER PUBLICATIONS

Threshold Detector VI—LabVIEW 2011 Help.*

(Continued)

Primary Examiner — Dung Hong
(74) Attorney, Agent, or Firm — Daniel S. Polley, P.A.

(57) ABSTRACT

A system and method for determining the presence of an asset or person at a particular spot within a location. The asset or person is provided with a beacon transmitting a beacon signal. A plurality of receivers are disposed throughout the location. In one embodiment, two or more adjacent or nearby receivers are grouped together to define a receiver cluster. The receiver cluster having the highest average signal strength from the signal being transmitted from the beacon of the asset or person as determined by an electronic identification and location tracking system determines the particular area within the location where the asset or person is present at.

15 Claims, 5 Drawing Sheets

(56) References Cited

U.S. PATENT DOCUMENTS

| | | |
|---|---|---|
| 9,100,766 B2 | 8/2015 | Soulodre |
| 9,363,784 B1* | 6/2016 | Friday ................. H04W 64/003 |
| 2002/0030600 A1 | 3/2002 | Starner |
| 2003/0146835 A1* | 8/2003 | Carter ................... G01S 5/0036 340/539.13 |
| 2008/0144864 A1 | 6/2008 | Huon |
| 2011/0148602 A1* | 6/2011 | Goh ...................... G01S 5/0252 340/10.41 |
| 2011/0211563 A1* | 9/2011 | Herrala ................ H04W 4/029 370/338 |
| 2012/0154115 A1 | 6/2012 | Herrala |
| 2014/0228059 A1* | 8/2014 | Jalali ..................... H04W 4/043 455/456.6 |
| 2014/0287778 A1 | 9/2014 | Jones et al. |
| 2016/0049028 A1 | 2/2016 | Kusens et al. |
| 2016/0098676 A1 | 4/2016 | Kusens et al. |
| 2016/0247342 A1 | 8/2016 | Kusens et al. |
| 2017/0188188 A1* | 6/2017 | Kang ................... H04W 4/029 |

OTHER PUBLICATIONS

Applicant Collateral Opportunities, LLC's pending U.S. Appl. No. 15/230,415 (currently unpublished).
Applicant Collateral Opportunities, LLC's pending U.S. Appl. No. 15/238,036 (currently unpublished).
Applicant Collateral Opportunities, LLC's pending U.S. Appl. No. 15/286,753 (currently unpublished).
Applicant Collateral Opportunities, LLC's pending U.S. Appl. No. 15/373,469 (currently unpublished).

\* cited by examiner

FIGURE 1: Registration of Assets / People to be Tracked

FIGURE 2: Registering a location

FIGURE 3: Determination of Presence at Location Rules Engine

FIGURE 4: Presence Determination at a Location Rules Engine

Sample of presence determination with Clustering of Receivers in a Location

US 10,187,755 B2

ELECTRONIC ASSET LOCATION IDENTIFICATION AND TRACKING SYSTEM WITH RECEIVER CLUSTERING

This application claims the benefit of and priority to U.S. Provisional Patent Application Ser. No. 62/234,512, filed Sep. 29, 2015, which is incorporated by reference in its entirety for all purposes.

BACKGROUND

Determining accurate indoor locations for people and objects has been the goal of numerous government, academia and corporate institutions for well over a decade. GPS, while excellent for outdoors location, isn't well suited for indoor location due to signal attenuation caused by the building materials causing significant power loss for the signals. Numerous technical approaches to accomplishing the goal of accurate indoor location have been researched, developed and tested though the effectiveness and accuracy of each of these methods can vastly differ.

The industry classifies indoor location technologies into infrastructure-based and infrastructure-free technologies. Infrastructure-based technologies require the installation and configuration of physical receivers, typically based on a radio-frequency technology such as IR, WiFi, RFID and Bluetooth but can also include receivers based on sound, magnetic signals or light. Infrastructure-free technologies, typically utilize the existing infrastructure available in a location such as WiFi access points, cellular/GSM signals, geo-magnetic and sound sources though they usually involve quite a bit of configuration in the form of fingerprinting, or the analysis of the specific properties of WiFi, Magnetic, Sound and other signals at various points within the room.

Once the initial infrastructure, fingerprinting, analysis and other implementation steps are done, the various systems currently in existence rely on various forms of signal triangulation, signal measurement, signal disturbance, movement detection, barometric pressure detection, or other forms to detect the location of a person or object in an indoor space. The technical names for these existing technologies or methods include, but are not limited to, 2.4 Ghz Phase Offset, 2.4 Ghz Time-of-Flight, Ultrasonic Time-of-Flight, IR/Radio Time-of-flight, Modulated Magnetic signals, WiFi+Bluetooth+IMU, WiFi Fingerprinting with Bayesian Filter, WiFi Fingerprinting with Neural Network, WiFi Time-of-Flight with Adaptive filter, WiFi+IMU Fingerprinting and Steerable Antenna Time-of-Flight.

The existing indoor location technologies have performance and accuracy issues related to a variety of factors including but not limited to requiring a line of sight between a persons' device or object and the beacons/sensors, signal bleed complications, interference from other sources, objects and construction materials, and even the human body acting as a barrier to a signal. Additionally, the overhead in terms of deployment of custom infrastructure, space evaluation, fingerprint analysis, system configuration, equipment costs and other system implementation related issues is relatively high for existing methodologies. The current disclosure is directed at addressing or reducing these issues with indoor location accuracy, performance and overhead with the additional benefit of user or object identification and tracking throughout a venue.

SUMMARY OF THE DISCLOSURE

A method and system is described that allows for the electronic determination of an object or person's location in an environment where existing technologies such as GPS are often unable to provide accurate location information. Additionally, the method allows for navigational services to be provided to persons, and real-time location determination and location tracking. The disclosed method preferably can work through a system of wireless radio, sound and/or light-based beacons communicating with a system of wireless radio, sound and/or light-based receivers. Wireless radio, sound and/or light-based beacons and receivers provide a system with real-time data about the person or objects whereabouts, allowing for the confirmation and tracking described above and below. Depending on the type of location using the system, in certain circumstances one or more functions of the system may not be available to users and companies alike. As a non-limiting example, where the system is used by a company that provides food and beverage service, a user can place an order for food/beverages and the order delivered to the person at their current location as determined by the system; whereas when the system is used by a company which retails consumer products the company may not implement this specific feature of the system The following non-limiting definitions are provided as an aid in understanding at least a preferred embodiment for the disclosed novel method and system:

| | |
|---|---|
| Electronic Location Identification & Tracking System Database | An electronic database where locations, permissions, object profiles and/or user profiles are managed and stored. |
| Electronic Location Identification & Tracking System | A specially programmed electronic or computer system which electronically determines users' or objects' locations, presence at locations, movements within a location and/or departure from locations based on information received from and being in communication with wireless radio, sound and/or light-based beacons and receivers. The system can be in electronic communication with the Electronic Location Identification & Tracking System Database. |
| Electronic Location Identification & Tracking System Application (App) | A specially designed software application "App" that is installed on the wireless radio, sound and/or light-based receivers and which allows and directs the wireless radio, sound and/or light-based receivers to communicate with wireless radio, sound and/or light-based beacons in order to identify the persons or objects' current location. |
| User | One or more persons who have entered the physical location of an organization who is using, wishes to use or is required to utilize the location identification and tracking system on their electronic device or provides a beacon signal from their electronic device for receipt by one or more wireless radio, sound and/or light-based receivers. |
| Objects | One or more physical items which are desired to be identified and tracked through the utilization of the system. |
| System Administrator | One or more persons responsible for entering, reviewing, managing, overseeing and/or maintaining information about each user and/or object in the system as well as configuring locations and performing receiver and beacon management. |
| Wireless Radio, Sound and/or Light-based Receiver | A computer system or electronic device including but not limited to cell phone, smartphone, tablet, laptop or other computer system that is installed at locations where |

| | |
|---|---|
| | users and objects are to be tracked and is specially programmed with the Electronic Location Identification & Tracking System App to permit communication with one or more wireless radio, sound and/or light-based beacons. |
| Wireless Radio, Sound and/or Light-based Beacon | A small receiver/transmitter capable of operating on short and/or long range wireless communication between electronic devices. In regards to this disclosed system, though not required, beacons are typically installed on or attached to people or objects desired to be tracked. Alternatively, a person's smartphone, cell phone, tablet, laptop or other electronic device can have beacon transmission software installed on it which utilizes the various technologies below to transmit its identity. Wireless radio, sound and/or light-based beacons can utilize technologies including, but not limited to, Near Field Communication (NFC), Bluetooth, WiFi, Light-Fidelity (LiFi), Magnetic, Ultrasound, InfraRed (IR), and Radio Frequency (RF). All of these technologies and similar current or similar later developed communication technologies are included in the term "wireless radio" wherever that term appears in this disclosure. |
| Receiver Cluster | A group of Wireless Radio, Sound and/or Light-based Receivers which as a group are utilized in connection with all members of the group in the determination of a user's or object's location. The receiver cluster can consist of one or more receivers, clustered together utilizing the same or different Wireless radio, sound and/or light-based technologies. |

DETAILED DESCRIPTION

Figure 1:
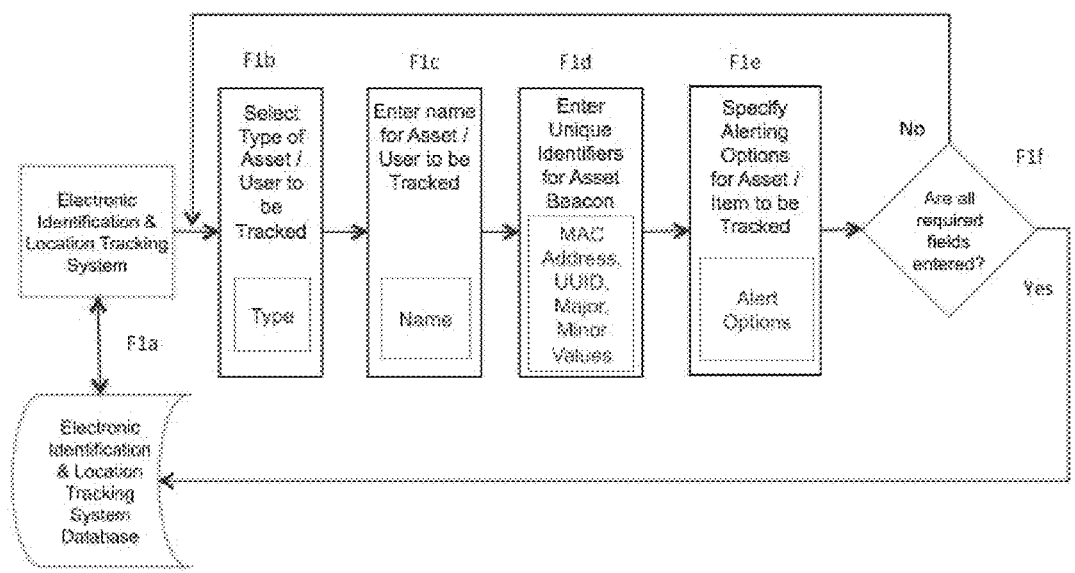
FIG. 1 is a process flow and block diagram illustrating the registration of an asset or person to be tracked in accordance with one embodiment for the disclosed system and method.

FIG. 1 shows one method for allowing a system administrator to register an asset or person to be tracked by the system through electronically inputting or entering various information for the asset or person which is stored in the Electronic Identification & Location Tracking System Database. This initial process allows assets or people to be electronically and automatically tracked within the location and to receive advertising and other location pertinent and/or aware messaging among other possible non-limiting uses.

At F1a, a system administrator or other designated person initiates a new asset/person creation through the system.

At F1b, the system administrator then selects the type of asset or person to be tracked. Examples of assets to be tracked can include but is not limited to computers, mobile devices, portable medical equipment, trays, carts, relatively expensive displayed items (e.g. paintings, jewelry, etc.) or other portable items.

At F1c, the system administrator enters a unique name for the asset or person to be tracked.

At F1d, the system administrator then assigns a Wireless Radio, Sound and/or Light-based beacon to the asset or person being registered. his can include but is not limited to a universally unique identifier or UUID (an identifier standard used in software construction and is a 128-bit value), media access control address or MAC address (unique identifier assigned to network interfaces for communications on the physical network segment), IP Address, or other unique identifiers. The assigned beacon can then be attached to or provided to the asset or person or the person's electronic device.

At F1e, the system administrator then configures alerting options for the asset or person. As a non-limiting example, these alerts can be configured to alert a person or group of people when an asset or person being tracked enters a given location, when an asset or person being tracked leaves a given location or when an asset or person being tracked changes locations.

At F1f, once all required fields are provided and the system administrator submits the form, the data is electronically sent to and received by the electronic location identification and tracking system database where the electronic information is saved/stored and accessible to the system for later use or reference.

Figure 2:
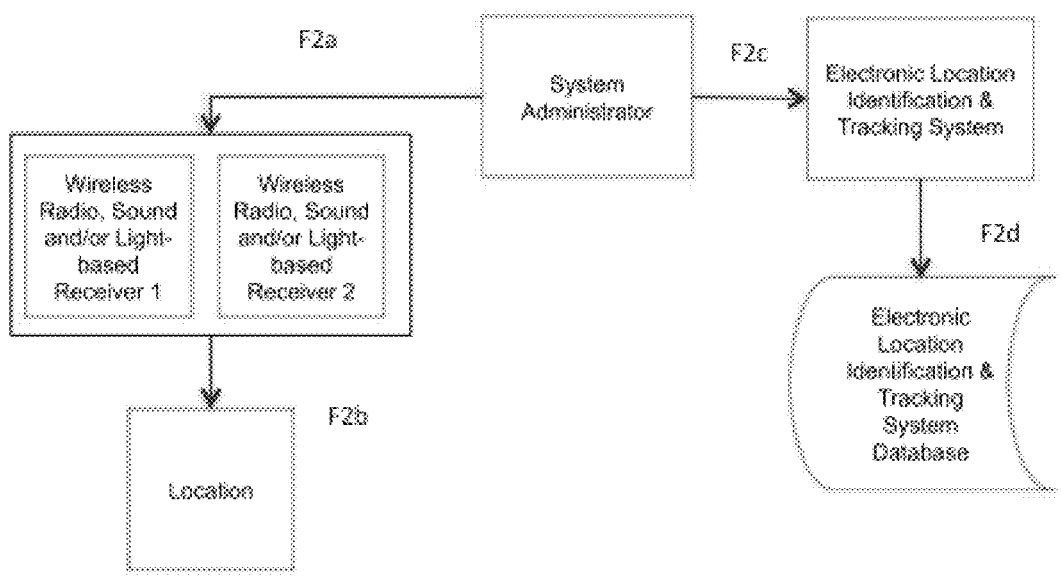
FIG. 2 is a process flow and block diagram illustrating the registration of a location as associated with a cluster of beacons location in accordance with one embodiment for the disclosed system and method.

FIG. 2 illustrates how a location is registered with the electronic location identification and tracking system.

At F2a, a system administrator configures either a single or cluster of wireless radio, sound and/or light-based receiver(s) with information including but not limited to its name, unique identifier (MAC Address, UUID or similar), group/organization, unique number within an organization, location, wireless networks, etc. Preferably, the receivers in a cluster have a unique identifier, which can typically be a MAC address, and the cluster can also be assigned a unique ID by the system. A cluster of receivers is created when two or more receivers are grouped together to define a single location and can include different types and technologies of receivers. As non-limiting examples, a receiver cluster may consist of a Bluetooth beacon receiver and a LiFi beacon receiver in one location but consist of a bluetooth beacon receiver and an Ultrasonic beacon receiver in another location. The combination of beacon type receivers are considered numerous and all considered within the scope of the disclosure.

As discussed below, receivers within a cluster can be the same or multiple types and used in any combination. The system administrator can select various options with regards to what the system should do when a given receiver in a location cluster does not receive a signal from a beacon that another receiver in the same location cluster does. Options include, but are not limited to, discarding this location from presence determination if a signal from a given beacon is not received by all receivers configured for the cluster. Alternatively, a default or static value can be assigned for the beacon signal strength for any beacon that is detected by one receiver in a cluster but not the other beacons in the cluster.

As a non-limiting example, where a three receiver cluster only receives signals from two of the receivers, a decision has to be made about what to do with the third receiver that didn't receive a signal. For explanation and illustrative purposes only, if the first two receivers report beacon signal strength values of 60% and 40%, the system could assign a value of 20% to the third, non-reporting one to bring the average down to 40% for the cluster. Alternatively, the system can choose to ignore the third receiver and just use the values from the two receivers that did receive signals, thus giving an average value of 50% for the cluster. The system could also assign a default value for instances where a receiver in a given cluster doesn't report, which could be applied to all non-reporting receivers in the cluster.

Location determination for a cluster of receivers can be based on, but is not limited to, an average of the signal strength received by each receiver in a cluster from a given beacon or through the application of a custom algorithm programmed into the system.

Preferably, the clustering method can be designed to enable micro-location services (i.e. be able to provide accurate location at a sub-room level). In one non-limiting example, the distances of the receiver clusters can range from a about a few feet radius to a several hundred foot radius. The receivers (within a cluster) can be placed anywhere from right next to each other up to a several hundred feet apart, depending on the level of accuracy needed for the given use. Clusters can be defined from a logical perspective as a specific location. From a technical perspective, the receiver clusters can, as a non limiting example, be defined by using their MAC Address, IP Address, or UUID, Major and Minor values or other value (identifiers). All receivers in a cluster preferably have the unique identifiers, though this is not considered limiting and other value configurations can be used.

At F2b, the configured wireless radio, sound and/or light-based receiver(s) are physically installed at the configured location and can be tested to ensure its operability. The beacons and/or receivers can be powered by various types of power sources, including, but not limited to, battery powered (e.g. CR2032 or AA batteries), USB power, solar panel powering alone or in addition to a battery, normal AC powering, etc.

At F2c, a system administrator then electronically accesses the electronic location identification and tracking system to enter in the installed wireless radio, sound and/or light-based receiver(s)' configuration and location information. Receiver clusters can be defined in the system at this point as well. When a location is created, the user inputs the number of receivers used to define that specific location. When a cluster of receivers is configured for a location, the system can preferably use the average of the received signal strengths for all receivers in a cluster in determining location or presence at a location. As a non-limiting example, if a location is configured for a cluster of 2 receivers, the signal strength received from each of the beacons is averaged to create a single signal strength value for that person or object. Optionally, should a beacon signal not be received for any given receiver assigned to a location cluster, the system can either assign a dummy value to this beacon signal or choose to ignore all beacons for this location. Additional configuration of the receiver(s) can also be performed at this step, which can include, but is not limited to, configuring notification settings, signal types, signal strengths, transmission power and device presence durations.

At F2d, the wireless radio, sound and/or light-based receiver's configuration and location information is stored in the electronic location identification and tracking system database and accessible to the system for later use or reference.

Figure 3:
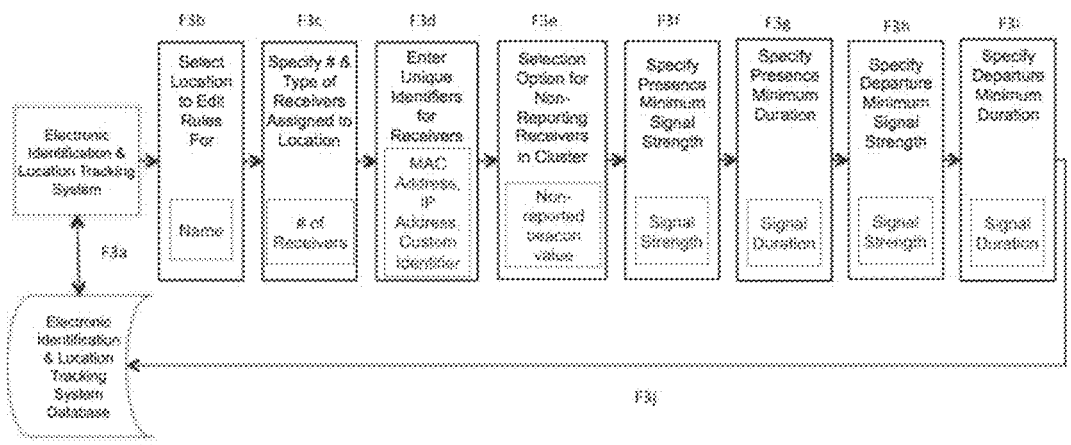
FIG. 3 is a process flow and block diagram of a location rules engine in accordance with one embodiment for the disclosed system and method.

FIG. 3 demonstrates how an asset(s) or person(s) presence at a location is determined and configured within the electronic identification & location tracking system. This process can also be utilized to edit presence determination configurations already stored in the database.

At F3a, the electronic identification and location tracking system queries the electronic identification & location tracking system database for a list of available locations. Preferably, the query can be performed at the time a system administrator/user wishes to edit the configuration for an existing location or add a new location. The query can be manually triggered by the user preferably going to a location configuration page in the software running on the system. Available locations can be ones that are entered into the system database as described above. Configuring refers to setting parameters for a location to assign a receiver or receiver cluster to a particular location as well as to aid in the determination of presence at that location based on, but not limited to, received signal strength and duration of signal from the wireless radio, sound and/or light-based beacons. This function can be typically reserved for a system administrator, though such is not considered limiting.

At F3b, the electronic identification & location tracking system displays a listing of available locations to configure. The system administrator can then select the location to configure or edit the configuration of. Reconfiguring the location can be for a variety of reasons, such as, but not limited to, adding additional receivers to a location cluster for better accuracy, replace a receiver that is faulty, or changing the presence determination criteria to make the system more or less sensitive/accurate. The system administrator may also elect to configure a new location in this manner.

At F3c. Once the location is selected, the system administrator may specify the number and type of receivers assigned to this particular location. A location can consist of one or more receivers, clustered together utilizing the same or different technologies. As a non-limiting example, a receiver cluster can consist of three receivers made up of IR, Bluetooth and Ultrasonic sensing receivers that work in conjunction.

At F3d, next the system administrator may now specify the Unique Identifiers for the receivers to be identified with this location. As a non-limiting example, if three receivers are configured for this location cluster, then 3 receiver identifiers must be selected to belong to this location cluster. If only a single receiver is selected then a single unique identifier is assigned to this location. Locations can be identified by using matching identifiers on the receivers with only a single differentiator. In one non-limiting embodiment, 2 identifying fields can be used for each receiver, MAC Address and Name. Each receiver can have values assigned to each of those 2 fields. As a non-limiting example, a 3 receiver cluster could have each receiver with a Name of "Front Entrance", each having a unique MAC address.

At F3e, next the system administrator may select what the system should do when it does not receive a beacon signal reading from a receiver assigned to a given location cluster (i.e. particularly where beacon signals were received by the other receivers assigned to the specific cluster). Options can include, but are not limited to, discarding this location from presence determination if a signal from all receivers configured for the cluster is not received, assigning a default or static value for the beacon signal strength for any receiver that is assigned to this cluster but didn't receive a signal, or ignoring the receiver from consideration in presence determination.

At F3*f*, next the system administrator may specify the minimum signal strength threshold for an asset or person to be considered present at a specific/particular location. This signal strength can be the measure of the strength of a known wireless radio, sound and/or light-based beacons transmitted signal strength as received by the receiver or receiver cluster. As a non-limiting example, the signal strength can be measured and calculated on a scale of 0 to 100% where the minimum signal strength threshold is set to 80%. This means that unless the receiver receives a signal from the wireless radio, sound and/or light-based beacons greater then the 80% strength threshold, they (i.e. the asset or person associated with beacon) will not be considered present at a location. Though it is preferred that the receivers are of the same type for a particular cluster, it is within the scope of the disclosure to have a location cluster made up receivers of differing types (i.e. Bluetooth, a light-based receiver and a sound based receiver, etc.). The signal strength measurement is intended to approximate the distance between the wireless radio, sound and/or light-based beacons and the receivers and can also include strength indicators including but not limited to RSSI (relative signal strength indicator) values. RSSI values can be used to approximate distances between the receiver and the beacon, and are preferably based on knowing a static power transmission level and comparing it to the received level. As the RSSI value drops, the beacon can be considered farther away from the receiver and the actual value can be used to approximate distances. Alternatively, similar to using RSSI, thresholds can be used for figuring if a beacon is close to a receiver or not, which can be a yes/no decision, as opposed to an RSSI algorithm which can provide three or more distance values. This setting is optional.

In one non-limiting example of use, a person can have a beacon on them as well as be carrying another object which also contains a beacon. Using the disclosed system, each beacon (i.e. the person and object) can be separately tracked. Though not limiting, preferably no preference or weighting is done for one type of object or person being tracked versus another.

Additionally, with Bluetooth and other wireless signals, objects like the human body can provide lots of signal interference. Thus, in another non-limiting example, a person could have a badge with a beacon on his front pocket and another beacon in his back pocket with his body facing the receiver. In view of the signal interference from the body, completely different signal strength for one of the beacons by the receiver could be determined because the body attenuated the signal coming from the other beacon. By positioning multiple receivers in the room, typically one of the receivers will remain unblocked at all times and using the average of all receivers at any given time will provide the accurate location for the person or object.

At F3*g*, once the minimum presence signal strength threshold has been entered, the system administrator has the option of specifying the minimum presence duration for that location. The minimum presence duration is a time value and can be expressed in any known and acceptable time format including but not limited to milliseconds, seconds, minutes and hours. As a non-limiting example, the system administrator can configure the value to 20 seconds. In this instance the wireless radio, sound and/or light-based receivers must report to the electronic identification & location tracking system a signal strength above the minimum threshold specified in F3*f* for a period of at least 20 consecutive seconds in order to consider the wireless radio, sound and/or light-based beacon(s) at that location. This setting is optional.

At F3*h*, next the system administrator may specify the signal strength threshold for an asset or person to be considered to have departed from a specific/particular location. This signal strength is the measure of the strength of a known wireless radio, sound and/or light-based beacons transmitted signal strength as received by the wireless radio, sound and/or light-based receivers. As a non-limiting example, the signal strength can be measured and calculated on a scale of 0 to 100% where the maximum signal strength threshold is set to 40%. This means that once the wireless radio, sound and/or light-based receiver receives a signal from the wireless radio, sound and/or light-based beacons lower then the 40% strength threshold, they will not be considered present at a location. The signal strength measurement is intended to approximate the distance between the wireless radio, sound and/or light-based receivers and the wireless radio, sound and/or light-based beacons and can also include strength indicators including but not limited to RSSI (relative signal strength indicator) values. This setting is optional. As a non-limiting example, signal strength can be measured in terms of decibels or RSSI. For decibels, the receiving device (phone, tablet, etc) can simply measure the signal strength in db. Accordingly, multiple tablets, smartphones, etc. can be placed (preferably permanently) through a room, facility, business location, etc. Also, a fixed value can be configured for the transmit power strength of the beacons and that power level (in db) can be used in the calculation of the RSSI which is an industry standard measurement algorithm that factors in the received signal strength in db and compares it against the known transmit power. Other potential forms of signal strength measurement include, but are not limited to Lux (light levels for light-based beacons), decibels in terms of volume (sound based-beacons) and magnetic fields strength. The type of object associated with a particular beacon may also determine the maximum/minimum strength threshold selected. As a non-limiting example, where the beacon is associated with a famous painting or sculpture a small or trivial drop in signal strength may be preferred as this could indicate that someone may be attempting to steal the painting.

At F3*i*, once the departure signal strength threshold has been crossed, the system administrator has the option of specifying the minimum departure duration for that location. The minimum departure duration is a time value and can be expressed in any known and acceptable time format including but not limited to milliseconds, seconds, minutes and hours. As a non-limiting example, the system administrator can configure the value to 20 seconds. In this instance the wireless radio, sound and/or light-based receiver reports to the electronic identification & location tracking system a signal strength below the threshold specified in F3*h* for a period of at least 20 consecutive seconds in order to consider the asset or person to have departed that location. This setting is optional.

At F3*j*, the locations presence determination configuration profile can be updated in the electronic identification & location tracking system database.

Figure 4:
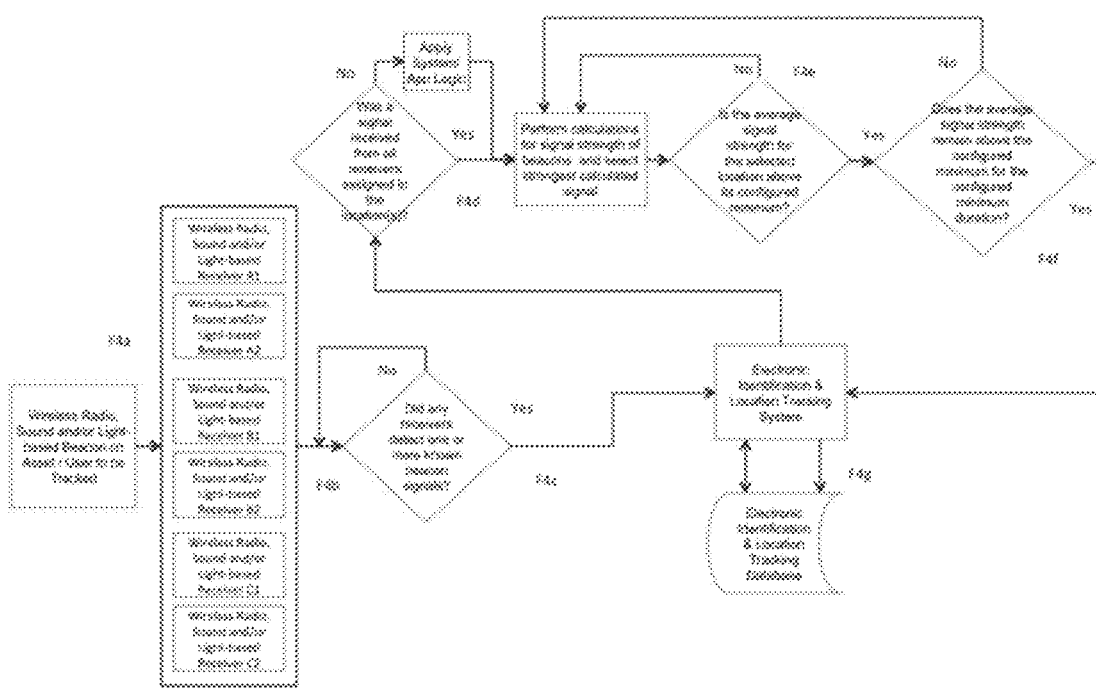
FIG. 4 is a process flow and block diagram for determining an asset or person's presence at location by the disclosed system and method.

FIG. 4 illustrates one embodiment of how the system determines the location of an asset or person being tracked and their presence at any given location based on their registered wireless radio, sound and/or light-based beacons.

At F4*a*, the wireless radio, sound and/or light-based receivers can be installed at various locations and can be constantly and automatically scanning for wireless radio, sound and/or light-based beacons broadcasting their information including, but not limited to, its name, unique identifier (MAC Address, UUID or similar), group/organization, unique number within an organization, location, wireless networks, etc.

At F4b, the wireless radio, sound and/or light-based receiver with the electronic identification and location tracking system application "App" downloaded and running (either in the foreground or as a background service) receives the broadcasted information from the wireless radio, sound and/or light-based beacons including, but not limited to its name, unique identifier (MAC Address, UUID or similar), group/organization, signal type and strength. If the beacon contains a recognized identifier as programmed into the App, it proceeds to step F4c. Otherwise, the App will continue to monitor for known beacon signals. This process preferably repeats at preprogrammed or configurable intervals so that the App can be frequently receiving beacon information.

At F4c, when a known beacon signal is received by the App, it sends the information received from the beacon including but not limited to its name, unique identifier (MAC Address, UUID or similar), group/organization, signal type and strength to the electronic identification and location tracking system. The electronic identification and location tracking system queries its database to determine the location properties of the known receiver reporting the received beacon signal information. This will include but is not limited to the type and number of receivers associated with the location assigned to the particular receiver and the configured logic for what to do when the system doesn't receive a signal from one or more receivers (or type of receivers) in a location cluster.

At F4d, the electronic identification and location tracking system makes a determination based on the information returned in F4c if a signal was received from all wireless radio, sound and/or light-based receivers assigned to a location or locations, if multiple receivers are configured for a given location. If signals from all wireless radio, sound and/or light-based receivers assigned to a location are received, the system proceeds to step F4e. If a signal was not received from all wireless radio, sound and/or light-based receivers in a location cluster, the system applies the programmed and configured logic for handling the missing receiver. This may include, but is not limited to, ignoring the location in its entirety if all receivers are not found, using a static value for the missing receivers or simply ignoring the missing receivers and calculating the average using just the data gathered from configured wireless radio, sound and/or light-based receivers.

At F4e, if the analysis performed in F4d indicates that an asset or person is near a given location, the system determines whether the wireless radio, sound and/or light-based beacon(s) assigned to the asset or person is in close enough proximity to the wireless radio, sound and/or light-based receiver(s) to be considered present at that specific area of a location. It does this by comparing the average beacon signal strength received by the receivers at the location to the configured minimum. If the average signal strength is below the configured value, the system will continue to perform the average signal strength calculations in F4d. If the average signal strength is above the configured minimum value, the system proceeds to step F4f. This step is optional and the system can be configured to simply determine an asset or person's location based on the highest average signal strength value received by the receiver clusters.

At F4f, the system begins counting to see if the average signal strength received by the wireless radio, sound and/or light-based receivers from the wireless radio, sound and/or light-based beacons attached to the asset or person is maintaining its average signal strength for longer then a configured duration for that location. If the average signal strength for the location cluster fails to remain above the configured minimum threshold for greater then a configured period of time, the system will continue to perform the average signal strength calculations in F4d. If the system determines that the average signal strength received by a location cluster is maintained above a configured threshold for longer then a configured period of time, then it will notify the Electronic Identification & Location Tracking system of the asset or person's confirmed presence at the given location.

At F4g, the electronic identification & location tracking system stores the asset or person's location and other information in the tracking database.

Figure 5:
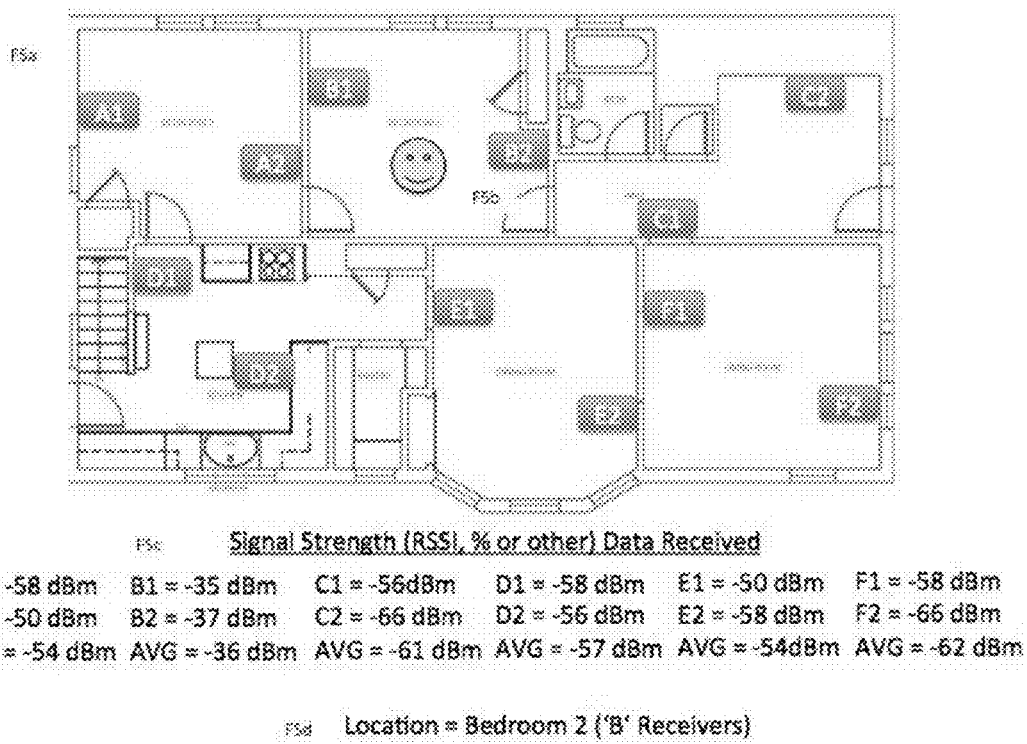
FIG. 5 illustrates a non-limiting sample of a customer presence determination using receiver clustering at a location in accordance with one embodiment for the disclosed system and method.

FIG. 5 demonstrates one non-limiting embodiment of how a cluster of wireless radio, sound and/or light-based receivers can be assigned to a location and used for location determination within the electronic identification & location tracking system.

At F5a, receivers are installed and configured for six locations, Bedroom 1 ('A' Receivers), Bedroom 2 ('B' Receivers), Hall ('C' Receivers), Kitchen ('D' Receivers), Dining Room ('E' Receivers) and Living Room ('F' Receivers). Though not limiting, each location has 2 wireless radio, sound and/or light-based receivers configured in the cluster. In one non-limiting example, tablet receivers can be mounted and used as one of the receivers for the system.

At F5b, an asset or person being tracked with a wireless radio, sound and/or light-based beacon attached and configured enters Bedroom 2 ('B' Beacons) as illustrated.

At F5c, the electronic identification & location tracking system application "App" receives beacon signals from all nearby wireless radio, sound and/or light-based receivers and sends them to the electronic identification & location tracking system. As a non-limiting example, the signal strength measurements for each beacon are displayed in the chart on the figure. The electronic identification & location tracking system calculates a signal average for each location based on all of the beacon signal strengths received by the receiver clusters for that location.

At F5d, the electronic identification & location tracking system makes a determination that the asset or person's location is in Bedroom 2 ('B' Beacons) based on a higher average signal strength received by the wireless radio, sound and/or light-based receivers in the Bedroom 2 location cluster as compared to the average signal strength received from the wireless radio, sound and/or light-based receivers in the other location clusters. This location determination can be saved and stored in the Electronic Identification & Location Tracking System Database by the system.

The system that performs the above described functions and steps can include several components including, but not necessarily limited to, the following:
1. One or more Wireless Radio, Sound and/or Light-based Beacon(s)
2. One or more Wireless Radio, Sound and/or Light-based Receiver(s)
3. Electronic Identification & Location Tracking System
4. Electronic Identification & Location Tracking System Application "App"
5. Electronic Identification & Location Tracking System Database 6. A public and/or private computer network to connect or communicate the user's device, beacons and Electronic Identification & Location Tracking System and database with each other.

The various components can be in electrical and wireless communication with each other.

To hopefully increase that the likelihood that the person has the beacon on his or her person, where a beacon is shaped like an employee ID badge or secured to the badge, the person can typically wear the badge at work for access control to doors, general security measures. The badges can also be used for authentication to access the person's computer. For objects, the beacons can be physically attached to the objects, Non-limiting objects, include, wheelchairs, beds, IV pumps, ultrasound machines, EKG machines, computers, military equipment, weapons, paintings, vehicles, valuables, etc.

The ability to electronically identify assets and desired persons, track asset and person's movements and identify presence at a location will provide significant administrative and financial benefits incident to operators of venues where traditional GPS location services are not available. Without limitation, these include the following benefits:

1. Provide venue operators the ability to identify an asset or person and the asset or person's precise location within their facility.
2. Provide venue operators the ability to determine an asset or person's presence at a location through configurable parameters.
3. Provide venue operators with real-time mapping of assets and persons being tracked in locations with receiver clusters installed.
4. Provide real-time notification when an asset or person being tracked enters or leaves a prescribed location with one or more Wireless Radio, Sound and/or Light-based Receiver(s)

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal number of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the disclosure has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A computer implemented method for registering a specific area within a location in connection with a specific position of a receiver cluster defined by two or more wireless radio, sound and/or light-based receivers within the location for use by an electronic location identification and tracking system to determine the presence of an individual or asset at the location, said method comprising the steps of:
   a. installing a plurality of wireless radio, sound and/or light-based receivers ("Receivers") at a location;
   b. electronically selecting two or more receivers but not all receivers from the plurality of installed Receivers to represent a specific area or specific spot within the location, wherein the selected two or more receivers defining a receiver cluster for use in determining a presence of a person or asset having a wireless beacon attached;
   c. electronically entering configuration or identification information for the two or more receivers selected for the receiver cluster and information regarding the specific area or specific spot within the location that the two or more receivers are installed at;
   d. electronically entering information regarding a minimum beacon signal strength threshold for each of the receivers in the receiver cluster
   e. electronically entering information regarding a minimum time duration that a receiver must receive a beacon signal exceeding a beacon signal strength threshold for each of the receivers in the receiver cluster in order for a receiver to be considered to have a receive a valid signal from a beacon associated with an asset or person; and
   f. storing the entered minimum time duration for each receiver, the entered minimum signal strength threshold for each receiver and the configuration or identification information for each receiver in the receiver cluster in an electronic database;
   wherein steps b. through e. are performed by an electronic location identification and tracking system in communication with the electronic database.

2. The computer implemented method for registering a specific area within a location of claim 1 wherein when a beacon signal is received by a receiver in the cluster of receivers that has a signal strength above the minimum signal strength threshold a presence determination is performed by the electronic location identification and tracking system and said method further comprising the steps of electronically entering instructions for handling any beacon signals received by the receiver that are below the minimum signal strength threshold or lack of received beacon signal by one or more receivers in the cluster during a presence determination through the electronic location identification and tracking system and storing the entered instructions in the electronic database.

3. The computer implemented method for registering a specific area within a location of claim 2 wherein the instructions are selected from one of the following group: (1) assigning a default or static value for each receiver in the cluster who did not receive a beacon signal that met the minimum signal strength threshold; or (2) discarding each receiver in the receiver cluster who did not receive a beacon signal that met the minimum signal strength threshold from any calculation performed by the electronic location identification and tracking system for the presence determination of an asset or person at the specific spot assigned to the receiver cluster.

4. The computer implemented method of claim 1 further comprising the step of repeating steps b. and c. until all receivers from the plurality of Receivers are selected and assigned to a specific receiver cluster, wherein each receiver from the plurality of Receivers is only assigned to one receiver cluster.

5. A method for determining a presence of an asset or person at a particular area within a location by an electronic location identification and tracking system, said method comprising the steps of:
   a. electronically receiving a beacon signal from a beacon associated with a particular asset or person by one or more wireless radio, sound and/or light-based receivers of a plurality of wireless radio, sound and/or light-based receivers, wherein two or more receivers of the plurality of receivers form a receiver cluster associated with a specific area or spot within the location, wherein each receiver of the plurality of receivers only associated with one receiver cluster;
   b. electronically determining whether the beacon signal is from a known beacon;
   c. for each signal from a known beacon, electronically determining a signal strength for the signal received by the one or more receivers;
   d. averaging the signal strength received by each receiver in a specific receiver cluster and comparing the averaged signal strength to other average signal strengths for all other receiver clusters for the location;
   e. wherein for the receiver cluster having a highest average signal strength as determined in step d. electronically determining by an electronic location identification and tracking system that a specific spot are area associated with the receiver cluster having the highest average signal strength is the location where the asset or person is present.

6. A method for determining a presence of an asset or person at a particular area within a location by an electronic location identification and tracking system, said method comprising the steps of:
   a. electronically receiving a beacon signal from a beacon associated with a particular asset or person by one or more wireless radio, sound and/or light-based receivers of a plurality of wireless radio, sound and/or light-based receivers, wherein two or more receivers of the plurality of receivers form a receiver cluster associated with a specific area or spot within the location, wherein each receiver of the plurality of receivers only associated with one receiver cluster;
   b. electronically determining a signal strength for the signal received by the one or more receivers;
   c. electronically determining if a beacon signal was received by each wireless radio, sound and/or light-based receiver associated with a particular receiver cluster;
   d. wherein if a signal was not received or a received signal was below the preconfigured minimum signal strength by each receiver associated with the particular receiver cluster further comprising the step of either (i) using a static value for each receiver who did not receive a signal or received a signal below the minimum signal strength when calculating an average signal strength for the particular cluster, or (ii) calculating the average signal strength only from the receivers who received a signal having a signal strength above the preconfigured minimum signal strength.

7. The method for determining a presence of claim 6 wherein if the signal was received by each receiver associated within the particular cluster of receivers further comprising the step of electronically determining a signal strength for each beacon signal received by the one or more receivers.

8. The method for determining a presence of claim 7 further comprising the step of electronically determining an average signal strength from all of the signal strengths determined from the signal received by the receivers from the particular cluster, where all of the signal strengths exceed the preconfigured minimum signal strength.

9. The method for determining a presence of an asset or person of claim 8 wherein for the cluster of receivers having a highest average signal strength electronically determining that a particular spot within the location associated with the cluster of receivers having the highest average signal strength is the location where the asset or person is present.

10. The method for determining a presence of claim 8 wherein for each receiver in the particular cluster where the signal strength is above the preconfigured minimum signal strength value for the receiver further comprising the step of electronically determining if the signal strength remains above the preconfigured minimum signal strength value for a preconfigured period of time.

11. The method for determining a presence of claim 6 wherein where the signal strength is above the preconfigured minimum signal strength value for the receiver further comprising the step of electronically determining if the signal strength remains above the preconfigured minimum signal strength value for a preconfigured period of time.

12. A method for determining a presence of an asset or person at a particular area within a location by an electronic location identification and tracking system, said method comprising the steps of:
   a. electronically receiving one or more signals containing identification information from at least one wireless beacon associated with a particular asset or person by one or more wireless radio, sound and/or light-based receivers running an electronic location identification and tracking system application ("App");
   b. electronically determining by the App whether each beacon signal received is from a beacon whose identifier is previously programmed into the App;
   c. for each known beacon signal received by the App, electronically querying a database to electronically receive asset or person properties for each known beacon and to electronically receive location properties for the one or more receivers, wherein the location properties include information on the number and identity of wireless radio, sound and/or light-based receivers grouped as a particular cluster of receivers for the particular area within the location;

d. electronically determining by the App if a signal was received from each wireless radio, sound and/or light-based receiver associated with the particular cluster of receivers;

e. wherein if a signal was received by each wireless radio, sound and/or light-based receiver associated with the particular cluster of receivers in step (d), electronically determining a signal strength for each beacon signal received by the one or more receivers;

f. electronically determining an average signal strength from all of the signal strengths received in step (e); and g. electronically comparing the average signal strength to a preconfigured minimum signal strength value for the particular area or particular cluster of receivers.

13. The method for determining presence of an asset or person of claim 12 wherein if the average signal strength is above the preconfigured minimum signal strength value the asset or person is considered present at the particular area within the location associated with the particular cluster of receivers.

14. The method for determining a presence of an asset or person of claim 12 wherein where the average signal strength is above the preconfigured minimum signal strength value further comprising the step of electronically determining if the average signal strength remains above the preconfigured minimum signal strength value for a preconfigured period of time.

15. The method for determining a presence of an asset or person of claim 12 wherein if a signal was not received by each wireless radio, sound and/or light-based receiver associated with the particular cluster of receivers in step (d) further comprising the step of either (i) using a static value for each missing receiver who did not receive a signal when calculating an average signal strength for the beacon signals of the beacons within proximity of a particular cluster of receivers, or (ii) calculating the average signal strength from the beacon signals received from the wireless radio, sound and/or light-based receivers associated with the particular cluster of receivers.

* * * * *